F. C. GREEN, DEC'D.
B. M. GREEN, ADMINISTRATRIX.
ELECTRICAL APPARATUS.
APPLICATION FILED DEC. 4, 1916.
1,326,049.
Patented Dec. 23, 1919.
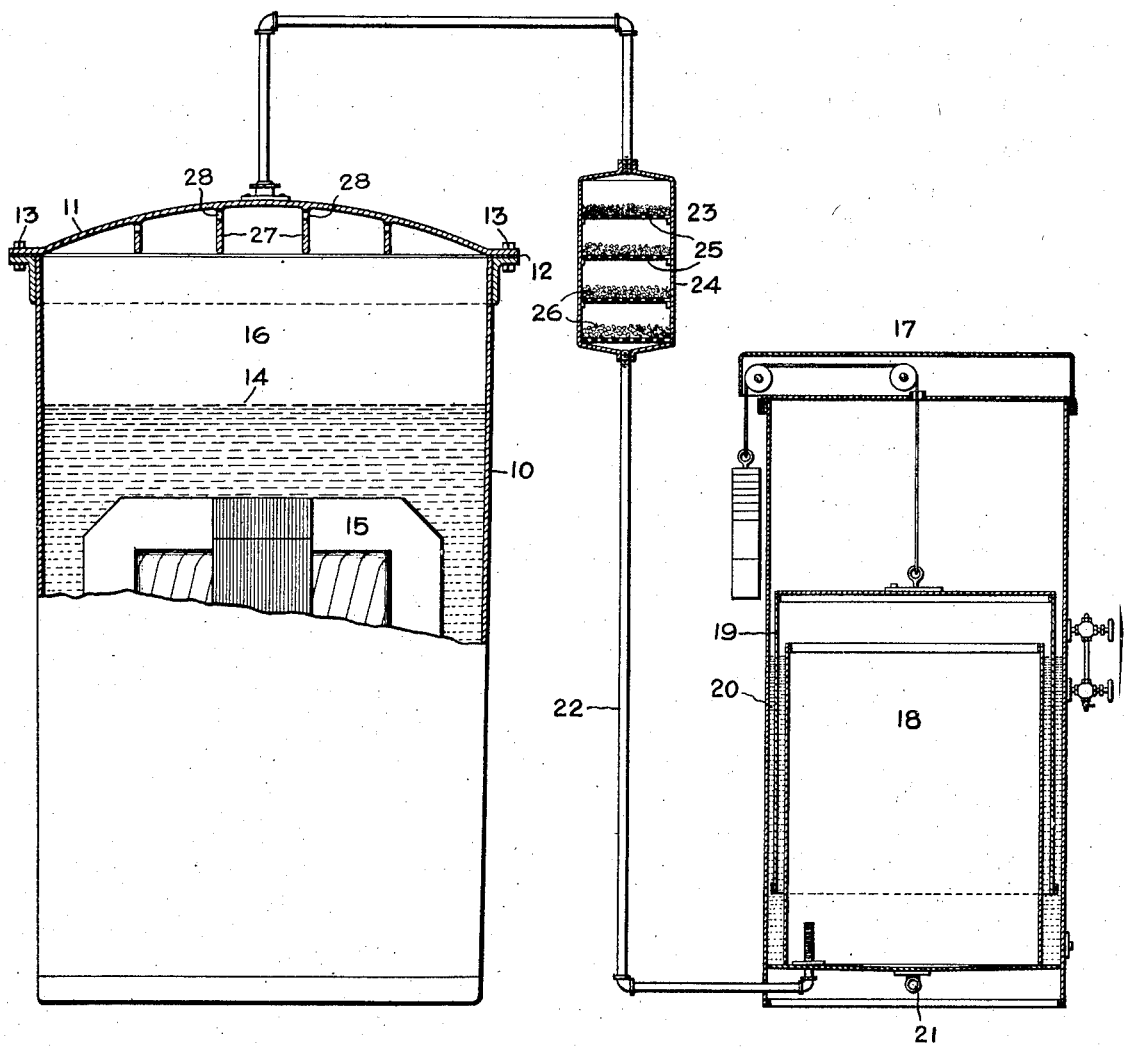
Inventor:
Frank C. Green, Deceased,
Bessie M. Green, Administratrix,
by *Albert G. Davis*
Attorney.

UNITED STATES PATENT OFFICE.

FRANK C. GREEN, DECEASED, LATE OF PITTSFIELD, MASSACHUSETTS, BY BESSIE M. GREEN, ADMINISTRATRIX, OF PITTSFIELD, MASSACHUSETTS, ASSIGNOR TO GENERAL ELECTRIC COMPANY, A CORPORATION OF NEW YORK.

ELECTRICAL APPARATUS.

1,326,049.   Specification of Letters Patent.   Patented Dec. 23, 1919.

Application filed December 4, 1916. Serial No. 135,098.

*To all whom it may concern:*

Be it known that FRANK C. GREEN, deceased, late a citizen of the United States, and a resident of Pittsfield, in the county of Berkshire, State of Massachusetts, during his lifetime invented certain new and useful Improvements in Electrical Apparatus; and that I, BESSIE M. GREEN, duly appointed administratrix of the said FRANK C. GREEN, do hereby declare, to the best of my knowledge and belief, that the following specification, taken in connection with accompanying drawings, is a clear, true, and complete description of said improvements.

This invention relates to electrical apparatus comprising a casing in which is housed a transformer, oil switch, or other electrical device, the electrical device being submerged within a liquid such as oil which it is undesirable to have in free contact with the atmosphere, and it has for its object the improvement of a device of this character.

In devices of this type and particularly in those devices in which a transformer is submerged within oil which partially fills the casing, the casing is usually closed and provided with a vent which communicates with the atmosphere, so that the space in the casing above the oil is filled with air. Now this practice, though almost universally followed prior to this invention, has been regarded as objectionable on several grounds: moisture from the atmosphere may be absorbed by the oil and hence the dielectric strength of the oil reduced, a solid substance ("sludge," so called) may be thrown down by the action of the air on the oil, an explosive mixture may be formed by the air and oil vapors within the tank (and ignited by any arc in the tank).

In accordance with this invention, provision is made for filling the space within the casing above the oil with an inert gas, such as carbon dioxid, which is not subject to the same objections as air and particularly which is incapable of forming an explosive mixture with the gases developed by the oil.

One embodiment of this invention is shown in the accompanying drawing, to which reference may be made for a complete understanding of the same.

Referring now to the single figure of the drawing, which is a vertical section through the device, partially in elevation, 10 is a casing provided with a cover 11, which is shown as forming a substantially air tight joint with the top of the remainder of the casing. For this purpose a gasket 12 is placed between the flattened peripheral portion of the cover and the top of the main body of the casing, the parts being held together by bolts 13. The casing is partially filled with oil 14 within which is submerged an electrical device such as a transformer 15, the space within the casing above the oil being indicated by the reference numeral 16.

In accordance with this invention, the space 16 is filled with an inert gas, such as carbon dioxid, and in the embodiment here illustrated, this gas is introduced to the space from a gasometer 17. The gasometer is provided with the usual expansible chamber 18, which is partially inclosed by the vertically movable cylinder or drum 19, the latter being sealed by a liquid 20 which is preferably also an oil, in order that no moisture may be introduced to the casing inclosing the electrical device from this source. The expansible chamber of the gasometer may be filled with an inert gas by attaching a suitable receptacle such as a tube of compressed carbon dioxid to a pipe 21 opening into the chamber 18. The expansible chamber of the gasometer communicates with the space 16 in the casing 10 by means of a pipe 22 in which is interposed a drying device 23 which is shown as comprising a casing 24 provided with a plurality of perforated disks 25, on which a suitable drier 26, such as calcium chlorid, is placed. When the cover 11 of the casing is formed with strengthening ribs 27, it is necessary to provide openings 28 in the uppermost portion of the ribs adjacent the cover, in order that air may not be pocketed between the ribs.

In order initially to get the apparatus in condition for operation, the casing may be entirely filled with oil, then after the gasometer and the pipe communicating with the casing are filled with the inert gas, the communicating pipe is connected to the casing and the oil in the casing then lowered away to leave the usual space above the oil, which will be filled with the inert gas as the oil is lowered. In operation, the movable cylinder of the gasometer is so counterweighted that the gas in the top of the cylinder will be under a slight pressure, for example about two-tenths of an ounce. In this manner the inert gas from the gasometer will take the place of any slight escape that may occur in the casing or housing of the electrical device. At the same time, it will be apparent that the expansion chamber provides for the usual expansion and contraction of the oil due to changes of temperature.

While carbon dioxid is mentioned as a suitable inert gas for the purposes of this invention, it will be understood that any other inert gas, such as nitrogen, or an inert gas diluted with an amount of air insufficient to form an explosive mixture, may be used. It will be understood, therefore, that when an inert gas is referred to in the claims, the meaning is to include any gas that does not form an explosive mixture with the vapors from the oil or which is otherwise suitable as herein indicated.

In accordance with the provisions of the patent statutes, the principle of operation of invention is described, together with the apparatus which is now considered to represent the best embodiment thereof; but it is to be understood that the apparatus shown is only illustrative, and that the invention can be carried out by other means.

What is claimed as new and desired to secure by Letters Patent of the United States, is,—

1. In an electric apparatus, the combination with a substantially air tight oil filled casing, of an electric apparatus submerged within the oil, a gasometer of the constant pressure type filled with an inert gas, and a communication between the portion of said casing above the oil level and said gasometer.

2. In an electric apparatus, the combination with a substantially air tight oil filled casing, of an electric apparatus submerged within the oil, and a gasometer filled with an inert gas connected to said casing above the oil space; said gasometer comprising telescoping containers adapted to maintain the inert gas under constant pressure and an oil seal between said containers.

3. In an electrical apparatus, the combination with a substantially air tight oil filled casing, of an electrical apparatus submerged within the oil, a gasometer of the constant pressure type filled with an inert gas, and a communicating connection between the portion of said casing above the oil level and said gasometer; said connection being provided with a gas filtering device for removing oil adulterating ingredients from said gas.

4. In an electrical apparatus, the combination with a substantially air tight oil filled casing, of an electrical apparatus submerged within the oil, a gasometer comprising telescoping containers filled with an inert gas under constant pressure, and a communicating connection between the portion of said casing above the oil level and said gasometer; said connection being provided with a gas filtering and drying device having a plurality of perforated partitions carrying drying and filtering reagents through which the gas is arranged to pass when traversing said connection.

In witness whereof, I have hereunto set my hand this 14th day of Nov., 1916.

BESSIE M. GREEN,
*Administratrix of the estate of Frank C. Green, deceased.*